No. 657,659. Patented Sept. 11, 1900.
A. JAMIESON.
SECONDARY BATTERY.
(Application filed Nov. 18, 1897.)

(No Model.)

WITNESSES:
J. Howard.
J. S. Lockwood.

INVENTOR
Augustus Jamieson
BY
A. P. Thayer
ATTORNEY

THE NORRIS PETERS CO., PHOTO-LITHO., WASHINGTON, D. C.

UNITED STATES PATENT OFFICE.

AUGUSTUS JAMIESON, OF ELIZABETH, NEW JERSEY, ASSIGNOR OF THREE-FIFTHS TO SYDNEY H. CARNEY, HENRY E. KNOX, AND WILLIAM WATT, OF NEW YORK, N. Y.

SECONDARY BATTERY.

SPECIFICATION forming part of Letters Patent No. 657,659, dated September 11, 1900.

Application filed November 18, 1897. Serial No. 658,896. (No model.)

*To all whom it may concern:*

Be it known that I, AUGUSTUS JAMIESON, a citizen of the United States, and a resident of Elizabeth, in the county of Union and State of New Jersey, have invented certain new and useful Improvements in Secondary Batteries, of which the following is a specification.

My invention consists of improvements in the composition and in the process of producing electrodes for electric accumulators and in construction of the plates or elements, as hereinafter described, reference being made to the accompanying drawings, in which—

Figure 1:
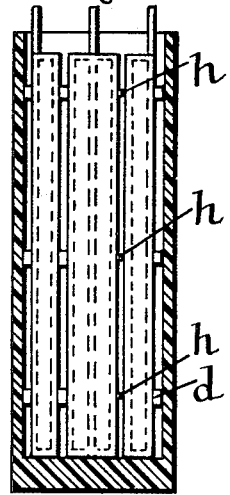
Figure 2:
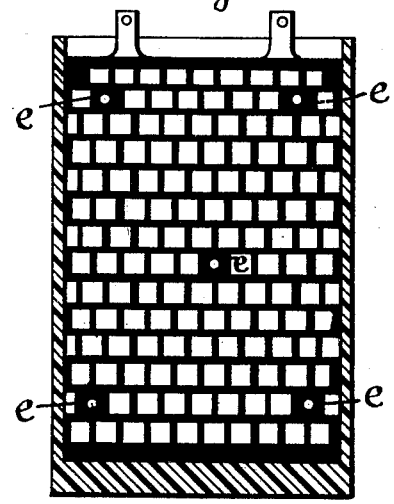
Figure 3:
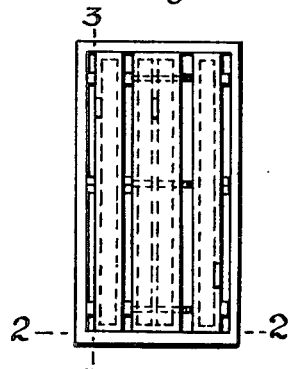
Figures 4, 5:
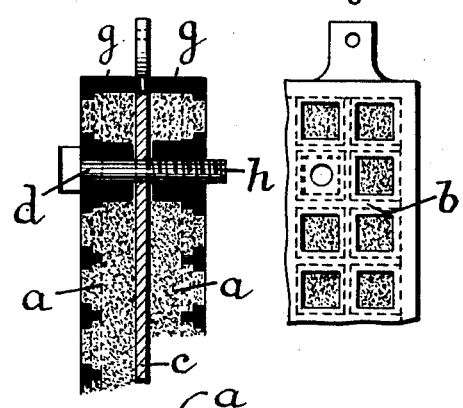
Figure 6:
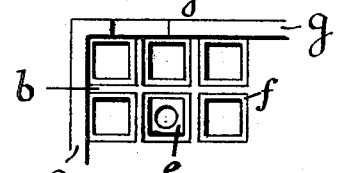

Figure 1 is a sectional elevation of a cell containing three elements, the section being taken on line 2 2 of Fig. 3. Fig. 2 is a sectional elevation of the cell on line 3 3 of Fig. 3. Fig. 3 is a plan view of the cell. Fig. 4 is a detail of one of the elements in transverse section and enlarged. Fig. 5 represents a portion of one of the elements in side view and enlarged; and Fig. 6 is an inside view of a portion of a grid of rubber or other light non-conducting material used as part of the support for the active material, the other part being a thin lead plate, which is also the conductor.

For the active material $a$ I employ chemically-pure lead carbonate and asbestos or other suitable fibrous material in about the proportions of one pound of the lead carbonate and a quarter of a pound of the fibrous material and mix them together in a plastic state with water, and plaster the mixture on a grid $b$ of rubber or other suitable light non-oxidizable and suitably-elastic material for applying the active material to the side of a plain thin conducting lead plate $c$ and clamping it thereto with insulated bolts $d$, extending through the active material and the lead plate, said grid $b$ being adapted to prevent the surface of the active material from scaling off under the expanding and contracting effect which the charging and discharging currents have on the active material, thus preventing the waste and accumulations of the active material in the bottom of the cell; but the asbestos may be omitted.

The grid $b$ is perforated, as shown in the drawings, to expose as much of the surface of the active material to the electrolyte as possible, and the perforations are formed with shoulders $f$, being smaller outside than inside of the plate, to oppose outward flow of the active material. Besides being the conductor the lead plate serves as one of the retaining-walls of the active material, the grid being the other.

The elements next to the walls of the cell have the active material applied on one side of the lead plate only; but in the intermediate elements both sides of the lead plate have the active material applied, and in these the clamping-bolts are threaded in one of the grids. In the other elements the bolts are inserted from the lead plate side and screwed into the grids. The heads of the bolts maintain spaces between the elements generally; but the projecting threaded ends, as $h$, are sometimes utilized.

The grids are formed with flanges extending all around the margin on the side to be applied to the lead plate, said flanges being as wide as the required thickness of the active material. The active material is applied to the grid in a plastic state and packed by a rolling-pin to the depth of the flanges, which serve as a guide to gage the thickness of the filling. The rolling-pin presses the mass into the perforations, filling them flush with the outside of the grid. Where the clamping-grids bear on the lead plate, bosses $e$ are formed for bearing-points. The clamping-grids are shaped in suitable stamping-dies while in a plastic state, thus being very cheaply made.

It will be seen that my improved construction of elements allows by the elasticity of the plates ample freedom for expansion of the active material under the influence of the electric current, while effectually preventing the scaling and peeling off of particles.

The grids of my improved elements being of non-conducting material effectually prevent conducting contact of the elements.

Two or more of the above elements are partly formed in a solution of carbonate of soda and therein exposed to the electric current to eliminate the carbonic acid, and after five or six charges and discharges the elements are then placed in a solution of sulfuric acid, and after a few charges and discharges the battery is formed and ready for use.

I am aware that carbonate of lead mixed with caustic soda or with caustic potash in a hard paste has been used for the active material and that electrodes of such composition have been set in a solution of carbonate of soda preparatory to forming, as in the patent to Carl Pollak, No. 505,125; but when such composition is used the carbonate of lead is, when reduced to metallic lead, too porous for practical purposes and has to be compressed into solid metallic lead to prevent disintegration in charging and discharging, and this greatly limits the rapidity of the charging and discharging of the battery in use. The composition of my active material avoids the use of the caustic soda or caustic potash, which together with the treatment by the electric current in the solution of carbonate of soda produces a spongy metallic lead, affording large surface capable of action in use without disintegrating and affording freer and quicker action than such as have to be compressed. By the omission of caustic soda or caustic potash a spongy metallic lead is produced that is not too porous for practical purposes, does not require rolling or hammering or compressing in any way, and has the great merit of being "capable of action in use without disintegrating, and affording freer and quicker action" than porous leads which have to be rolled, hammered, or compressed in any similar way.

I claim—

The process of producing electrodes for electric accumulators which consists in applying a plastic mixture consisting of lead carbonate and water only to a supporting-plate then drying, and with a suitable electrode, treating the same, as a cathode by an electric current in a solution of carbonate of soda, whereby the carbonic acid is eliminated and a spongy but non-disintegrating metallic lead is produced ready for use without compressing.

Signed at New York, in the county of New York and State of New York, this 25th day of October, A. D. 1897.

AUGUSTUS JAMIESON.

Witnesses:
A. P. THAYER,
J. HOWARD.